United States Patent [19]

Hosaka et al.

[11] Patent Number: 4,711,560
[45] Date of Patent: Dec. 8, 1987

[54] IMAGE PROCESSING APPARATUS

[75] Inventors: Masao Hosaka, Sagamihara; Takashi Saito, Ichikawa, both of Japan

[73] Assignee: Canon Kabushiki Kaisha, Tokyo, Japan

[21] Appl. No.: 946,626

[22] Filed: Dec. 29, 1986

Related U.S. Application Data

[63] Continuation of Ser. No. 751,424, Jul. 3, 1985, abandoned.

[30] Foreign Application Priority Data

Jul. 10, 1904 [JP] Japan .................................. 59-143476
Jul. 10, 1984 [JP] Japan .................................. 59-143477
Jul. 10, 1984 [JP] Japan .................................. 59-143478

[51] Int. Cl.⁴ .............................................. G03G 15/00
[52] U.S. Cl. ................................. 355/14 C; 355/14 R
[58] Field of Search ................. 355/14 R, 14 C, 3 R, 355/1, 7; 340/700

[56] References Cited

U.S. PATENT DOCUMENTS

| 4,186,299 | 1/1980 | Batchelor | 355/14 R X |
| 4,297,022 | 10/1981 | Lester | 355/1 X |
| 4,371,898 | 2/1983 | Nakamura | 355/7 X |
| 4,393,375 | 7/1983 | Sugiura et al. | 340/700 |

FOREIGN PATENT DOCUMENTS 59-87470 5/1984 Japan .

Primary Examiner—A. C. Prescott
Attorney, Agent, or Firm—Fitzpatrick, Cella, Harper & Scinto

[57] ABSTRACT

Image processing apparatus, such as a copier, having a removable medium containing programs for controlling the image processing apparatus, so that the apparatus is capable of performing multiple functions by means of the programs, which programs are controlled by a monitor program provided in the apparatus.

17 Claims, 12 Drawing Figures

IMAGE PROCESSING APPARATUS

This application is a continuation of application Ser. No. 751,424 filed 7/3/85 now abandoned.

BACKGROUND OF THE INVENTION

1. Field of the Invention

The present invention relates to an image processing apparatus, and more particularly to the operability thereof.

2. Description of the Prior Art

Recent remarkable progress in office automation has lead to the commercialization of various electronic office equipment. Particularly marked is a recent trend to combine this office equipment as a united system.

As an example of such electronic equipment, a plain paper copier has played a principal role in the office automation, as a hard copying machine because of the superior image quality thereof, and is becoming to function as a work station in combination with a cathode ray tube. In this manner the copiers are representative of office automation equipment in the office, and are available in varied forms, from high-class ones having the function of work station to low-class ones designed as a personal copier. This equipment is based on semiconductor technology, of which remarkable progress has resulted in a dramatic improvement in cost performance, i.e. a significant increase in performance far larger than the increase in cost.

Such improvement in performance has however resulted in a new problem in the man-machine interface. Stated differently this equipment has become more difficult to use for the users.

For example, a personal computer is quite easy to operate for those already familiar with it, but a beginner is unable to understand what kind of function is achievable by which key in the keyboard. For this reason, certain recent personal computers or computerized equipment are designed to provide a message on the display screen or a voice message indicating an appropriate key to be operated, in response to a particular command, for example "HELP". Also there are certain machines which do not require the entry of "HELP" command but displays a menu for instructing the use how to operation, in case no command is entered for a predetermined length of time. However a copier is used in a different manner compared with such computerized equipment, and has to be easily usable to anybody in the office. Nevertheless recent copiers are designed for numerous functions such as the setting of copy number, selection of sheet sizes, variable image magnification, automatic density adjustment, selection of automatic or manual sheet feeding, a programmable margin setting by image shifting, automatic two-sided copying, date printing, selection of sorting mode or stacking mode in which the copy tray is cycled at an interval or a colored sheet is interleaved at every ten or five copies, an automatic document feeder mode, a copy charge counting mode etc. In a full-color copier there are further added a selection of full-color or mono-color mode, and an adjustment of color rendition. In this manner the input commands from an operation unit are becoming extremely difficult for a beginner to understand.

FIG. 1 shows an example of an operation/display unit of an ordinary medium-speed copier, which can be roughly divided into six blocks. A block (1) includes seven keys K1–K7 for selecting a same-sized image, a size reduction in one of five steps, or a size enlargement in one step. A block (2) has three selector keys K8–K10 for selecting one of three cassettes U1–U3, wherein a sheet size in a cassette selected by said selector keys is indicated on the panel. A block (3) is used for selecting the automatic or manual density control, wherein a key K13 selects the automatic or manual density control and keys K11, K12 are used for density setting in case manual density control. A block (4) is used for setting the number of copies, which is entered by numeral keys K14–K23. A block (5) includes a copy start key K24, an interruption key K25, and a clear/stop key K26. A block (6) is used for selecting the copy discharge mode, in which a key K27 selects the usual stocker, a key K28 selects a sort mode, and a key K29 selects a collating mode.

In this manner the number of command keys amounts to 29 in such relatively simple machine, and will increase further if the functions are further diversified.

On the other hand, the control circuit of a copier of a former generation is composed of input cams and relay sequences. The counter is also composed of a mechanism, and other command keys are limited to a start key and a stop key. Such copier is quite simple in operation if certain inconveniences in manual setting are ignored, and may be more feasible for the users. In this manner the improvement in the performance has been achieved at the sacrifice of ease of operation, but many highly advanced functions are left unused because the users do not understand the method of operation. Such tendency seems to become more apparent.

Also the designers of the copier tend to incorporate various functions to meet the requirements of various offices and users, but the sheet sizes are often limited in each office, and also the image reduction or magnification in usual offices is conducted in most cases with one or two determined ratios.

SUMMARY OF THE INVENTION

In consideration of the foregoing, an object of the present invention is to provide an image processing apparatus adaptable to the specification or convenience of each user.

Another object of the present invention is to provide an image processing apparatus with flexible functions in response to multiple softwares.

Still another object of the present invention is to provide an image processing apparatus capable of achieving different functions in a same hardware by means of different operating systems.

Still another object of the present invention is to achieve a single function by suitably selecting a software according to the purpose of use of the image processing apparatus such as copier.

Still another object of the present invention is to achieve flexibility in the apparatus by constantly storing a program for security, diagnosis and monitoring in the apparatus and entering a sequence program according to the purpose of user, thereby separating the hardware from the software.

Still another object of the present invention is to provide an image processing apparatus externally provided with a memory medium for sequence program capable of recording information on the status of use, maintenance, and diagnosis of the apparatus.

Still another object of the present invention is to provide an image processing apparatus in which the operation mode of the apparatus is stored in a memory medium such as a card for enabling rapid and easy use of the apparatus.

Still another object of the present invention is to provide an image processing apparatus in which diagnostic information is accumulated in a recording medium such as a card thereby facilitating the maintenance and reducing the non-operable time.

Still another object of the present invention is to provide an image processing apparatus with an improved operability.

Still another object of the present invention is to simplify the operation/display unit of the image processing apparatus, thereby reducing the cost thereof.

Still another object of the present invention is to provide a system in which the hardware is separated from the software, in order to achieve different functions according to the operating instructions of the apparatus.

Still another object of the present invention is to provide an image processing apparatus which can be operated by an operator from a distant location.

Still another object of the present invention is to store control information in a card or a cassette which is separate from the apparatus and can be used as a key switch, thereby prohibiting the use by an unauthorized person.

DETAILED DESCRIPTION OF THE PREFERRED EMBODIMENTS

Figure 2:
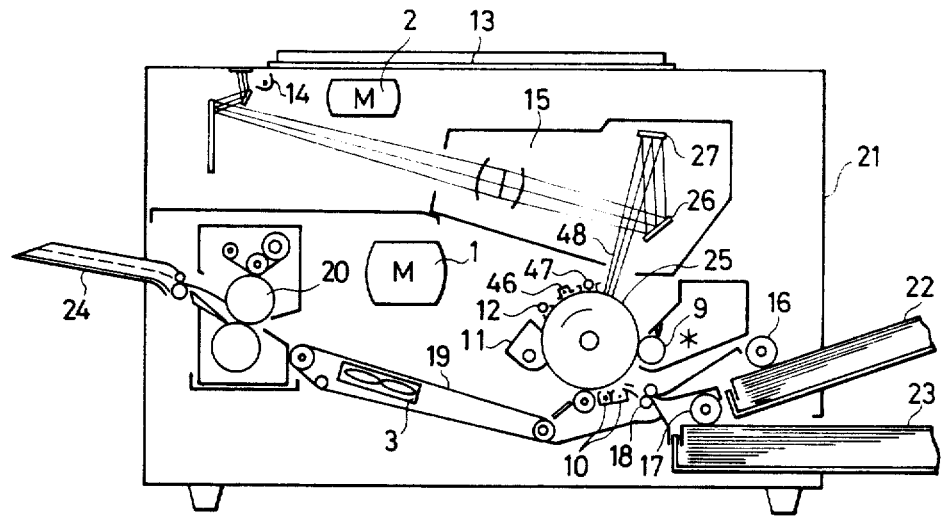
FIG. 2 is a schematic view of a copier constituting an example of the image processing apparatus in which the present invention is applicable.

FIG. 2 shows a copier constituting an example of the apparatus in which the present invention is applicable. Said copier is provided with two driving motors, one for driving the main mechanisms (photosensitive drum, sheet feeding and transport) and the other for driving the optical system. Naturally there are also employed other motors such as cooling fan motor, sheet transport motor, fixing roller motor etc., but the principal part of the apparatus is driven by the first-mentioned two DC motors.

In the following there will be given an explanation on the structure of the apparatus while making reference to FIG. 2. At a lateral end of the main body 21 of the copier there are provided two sheet feeding cassettes 22, 23, while a discharged sheet tray or stocker 24 is provided at the opposite end. Along the periphery of a photosensitive drum 25, there are provided, as illustrated, a corona charger 46, an erasing lamp 47, an optical system 48, a developing roller 9, a transfer/separating charger 10, a cleaning unit 11 and a pre-exposure lamp 12. On the upper face of the main body 21 there is provided a contact glass 13. An original document placed thereon is illuminated by an exposure lamp 14, and the reflected light is guided to said optical system 48 through a lens system 15. Sheets from said sheet cassettes 22, 23 are supplied, by means of feed rollers 16, 17 to a registration roller 18. After the transfer of a toner image from said photosensitive drum 25 by means of said transfer/separating charger 10, the sheet is guided, by means of a conveyor belt 19, to fixing rollers 20, and is finally discharged to the tray 24.

A main driving motor 1, for driving the drum, transport system, fixing unit and other mechanisms than the optical system, is composed of a DC servo motor for achieving a constant speed. An optical system driving motor 2, is also composed of a DC servo motor. A suction motor 3, for sucking the sheet to the conveyor belt 19 for transport to the fixing rollers 20, is also composed of a DC motor. In the present apparatus DC motors are employed for the driving motors in order to avoid the trouble of gear ratio change according to the frequency (50 or 60 Hz) of the power supply. It will also be noted that the DC motors are often used for such purpose as they can provide a higher torque in a smaller dimension, compared to AC motors.

The function of the above-described apparatus is as follows. When a power switch is turned on, the photosensitive drum is initialized by cleaning and elimination of surface potential by the pre-exposure lamp, whereby a uniform surface potential is realized on the photosensitive drum.

In response to the actuation of an unrepresented copy button, a desired sheet is fed from the cassette 22 or 23 and reaches the registration roller 18 for achieving the registration of the leading end. In the meantime the sheet size is detected for example with photosensors. For this purpose reflective photosensors are arranged corresponding to various sheet sizes and the sheet size is detected by measuring the running time of the sheet. The information on the sheet size is utilized for making blank exposures on the leading, trailing and lateral margins of the photosensitive drum thereby toner deposition outside the image area. During the scanning operation of the optical system, an unrepresented photodiode reads and digitizes the density and size of the original, and the obtained information is fed back on real-time basis to automatically control the image density. In the present apparatus, said information is fed to an unrepresented developing bias unit to adjust the developing bias, thereby automatically obtaining an appropriate image density.

On the other hand, the optical system for scanning the original is controlled by a servo motor, and performs a full-size scanning or a short-size scanning with a doubled speed in response to the aforementioned information on the sheet size.

The sheet which has received the transferred image as explained above is subjected to image fixation in the fixing rollers 20 and stacked on the tray 24.

Figure 1:
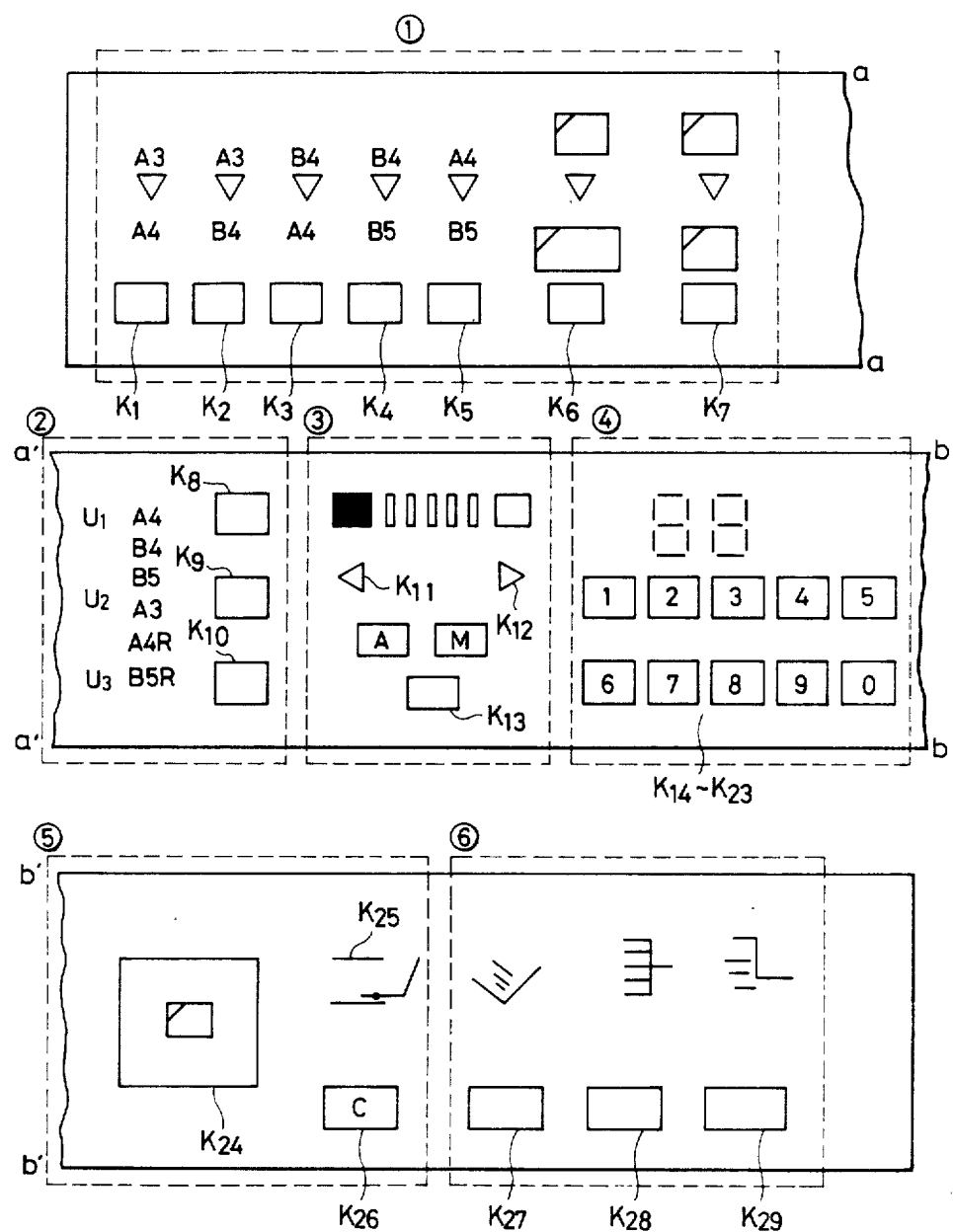
FIG. 1 is a schematic view of an operation/display unit of an ordinary copier.
Figure 3:
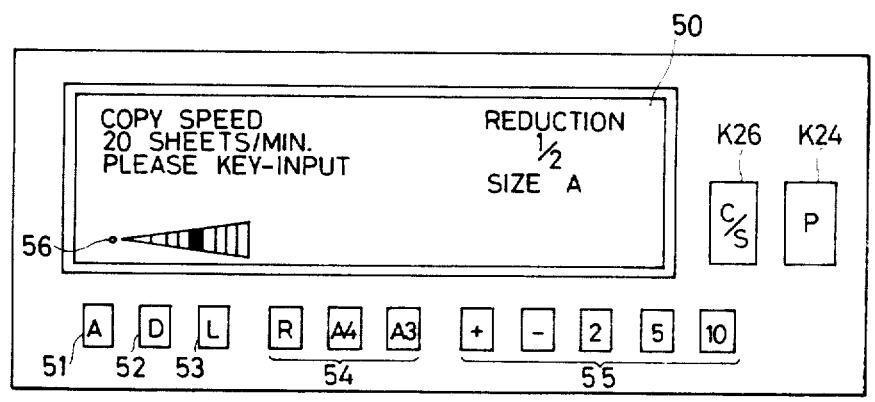
FIG. 3 is a view showing an example of an operation/display unit according to the present invention.

FIG. 3 shows an example of an operation/display unit according to the present invention, which is clearly simplified from the unit shown in FIG. 1. In the simplified unit there are provided a multifunction display unit 50, density adjusting keys 51-53, a sheet size key 54, a copy number setting key 55, a density display unit 56, a clear button K26 and a copy button K24. As the functions of the keys vary according to the software employed in the apparatus, they are indicated by a display unit capable of changing the display according to the software. For this purpose it is also possible to employ a touch panel for displaying the keys and indications in the same place, thereby enabling the user to enter the instructions by touching the panel.

Figure 4:
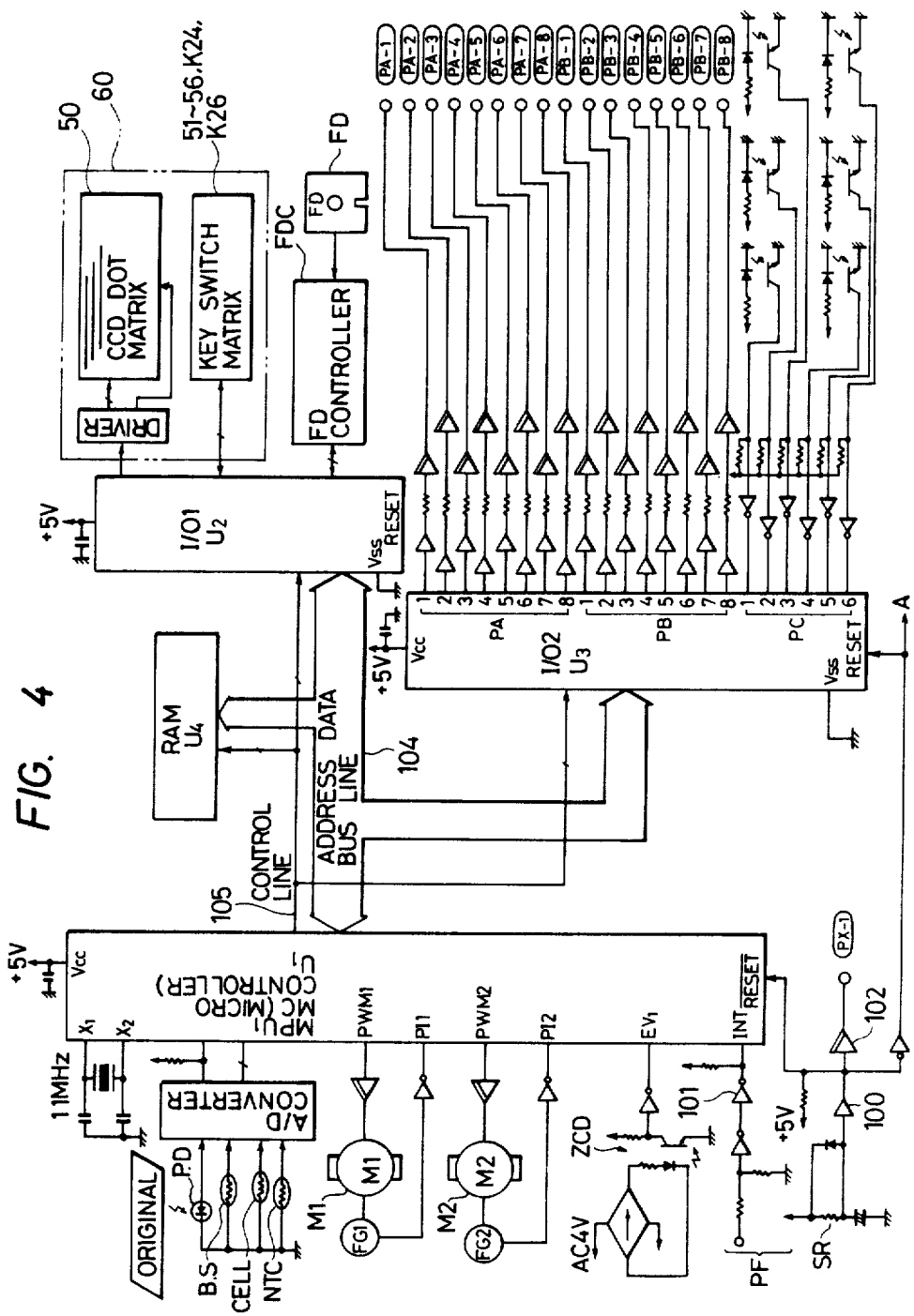
FIG. 4 is a block diagram showing a system embodying the present invention.

FIG. 4 shows an embodiment of the system of the present invention, comprising a microcontroller U1, I/O ports, U2, U3 and a random access memory U4. There are also shown TTL buffers 100, TTL inverters 101 and npn power transistors 102. The present system is featured by a fact that the function thereof is adjustable according to a sequence control program selected by the user. Referring to FIG. 4, the user loads a suitable program, stored in a floppy disk FD, into the memory U4. There is provided a floppy disk controller FDC for this purpose. If the program loading at each use is tedious, the random access memory U4 may be composed of a non-volatile memory provided with a back-up battery. However the use of such floppy disk can be more convenient for administering the use of copier in different divisions, as such floppy disk can be utilized instead of a key switch. The floppy disk stores a sequence specifically adapted to each division, and may also be used for storing the information on the status of copying when the copying operation is completed. Also such floppy disks can be collected monthly for accounting of copy charges, and can facilitate the maintenance service of the apparatus if the information on machine failure, etc. is also stored.

The program source is naturally not limited to the floppy disk but can be any non-volatile memory such as bubble memory or semiconductor memory.

In the following there will be given a more detailed explanation on the apparatus shown in FIG. 4.

The microcontroller U1 has a one-chip structure incorporating intelligent servo functions for copier control, without discrete external components.

Intelligent I/O ports PWM1, PWM2 of the microcontroller MC (U1) drive two DC motors (main driving motor M1 and an optical scanner (scanning motor) M2). A frequency generator FG1 of the main driving motor M1 generates pulses PI1, and the microcontroller U1 is provided with two counters respectively for counting said pulses for sequence control and measuring the interval of said pulses for servo control. Pulses PI2 from a frequency generator FG2 of the optical scanning motor are also used, by means of two registers, for the detection of position and speed of the optical scanning motor.

In this manner it is rendered possible to reduce the number of external and exposure components and to dispense with an exclusive encoder for generating clock pulses for the entire sequence control. The timing control pulses are supplied to a port PI1, and the motor servo control is executed in the registers of the I/O ports of the microcontroller, without the intervention of any program, so that the central processing unit can be exclusively used for other sequence controls. Consequently, in a copier limited to real-time data processing, it is no longer necessary to use plural microcomputers for automatic control, and there are achieved significant advantages in improved reliability, reduced cost and space saving. FIG. 4 shows an example of a controller for a medium-speed copier with a speed of 20 to 30 copies per minute. In this system there are employed expansion I/O ports for increasing the number of I/O ports of the microcontroller, but a microcontroller alone is enough for a smaller system. An A/D converter of 4 channels is provided for receiving analog data for automatic feedback control and thus achieving temperature control (NTC), detection of the density of the original (PD), body detection (BS: detecting infrared ray from a human body and activating a voice synthesizer), and light intensity detection (CELL) for lamp control. There are also shown a zero-cross detector ZCD for the AC power supply; a power failure detecting circuit PF which, upon detection of a failure in the power supply, supplies a signal to an interruption port INT of the microcontroller thereby interrupting the program execution and retaining necessary data; a system resetting circuit SR which is connected to a RESET port of the microcontroller MC (U1), a DC power relay PX-1 and RESET ports of the expansion I/O ports U1, U2, in order to reset the RAM, etc. at the start of power supply; an address data bus line 104; and a control line 105.

The expansion I/O port U2, for principally controlling the floppy disk, keys and display, controls the operation/display unit 60. On the other hand, the expansion I/O port U3 is used for sequence controls as the expansion of the I/O ports of the microcontroller, wherein ports PA-1 to PA-8 are respectively used for controlling the pre-exposure lamp, sheet feeding clutch, registration clutch, stepping motor for lens magnification adjustment, cleaning, used toner transport motor, high-voltage power supply, power relay, and heater. There are also provided a port PB-1 for lamp control; ports PB-2 to PB-4 for erasing lamp control; ports PB5 to PB7 for developing bias control, and a port PB-8 for buzzer control. Ports PC-1 to PC-6 are used for receiving detection signals respectively indicating the remaining amount of toner, amount of recovered toner, an original, a sheet in the cassette, sheet jamming and sheet discharge. The use of the above-described intelligent microcontroller allows to simplify the control device and the program structure.

Figure 5:
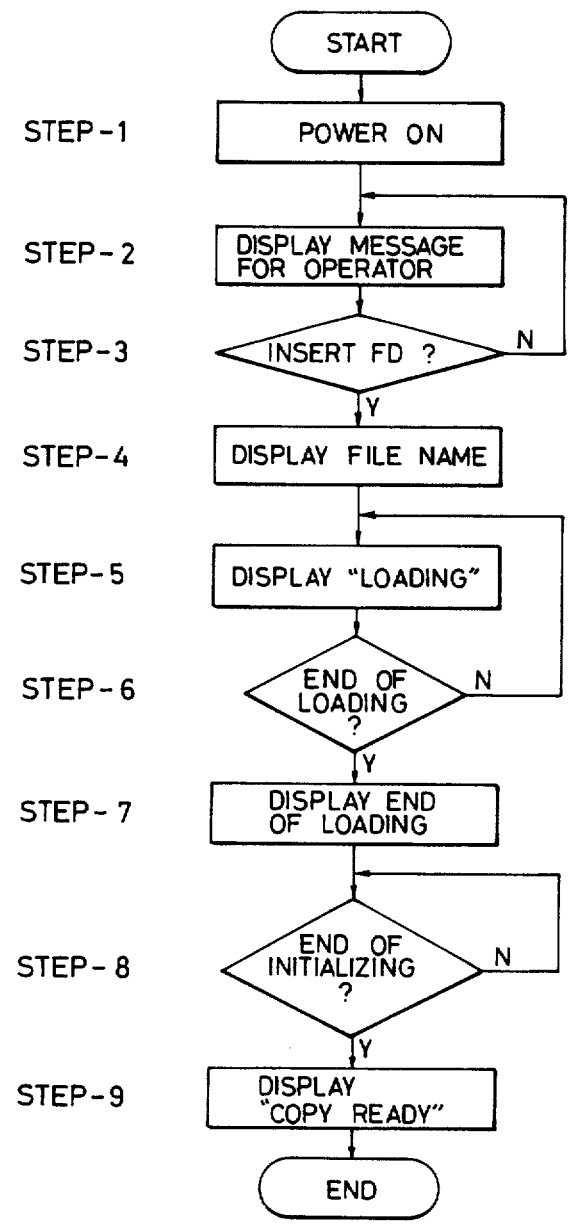
FIG. 5 is a flow chart showing an initializing program adaptable to the present invention.

FIG. 5 shows a flow chart of initialization by a monitor program stored in the microcontroller.

Upon turning on of a main switch in a step 1, a step 2 displays, on the display unit 50, a message to the operator such as "Insert your file". When a step 3 identifies the insertion of a floppy disk FD, a step 4 displays the content of the files of the floppy disk on the display unit 50 and loads file program for sequence control in the RAM U4 shown in FIG. 4. A step 5 displays, on the display unit 50, that the loading operation of the file program is in progress. When a step 6 indentifies the completion of said loading operation, a step 7 displays the completion of said loading operation on the display unit 50, and performs the initialization process, i.e., the initial heating of the heater, cleaning of the photosensitive drum and initial positioning of mechanisms. When a step 8 identifies the completion of said initialization process, a step 9 displays a message that the copying operation is enabled. At the same time the meanings of the keys 51-55 shown in FIG. 5 are determined according to the program loaded from the floppy disk, and the sheet size, image magnification and number of copies per minute are determined. The copying speed is rendered variable from a low speed of 10 copies per minute to a high speed of 60 copies per minute according to the program. Consequently a suitable program may be loaded from the floppy disk to select either a highest image quality at a low copying speed or a higher copying speed at the sacrifice of the image quality. Thus, upon loading of a file program, the step 9 displays the corresponding menu as shown in FIG. 3. Also displayed, though not represented, is the copying time required for the number of copies set by the operator.

As explained in the foregoing, it is rendered possible to (1) standardize the hardware, (2) improve the operability for the user, and (3) adapt the versatile apparatus to a simplified object of the user.

The sequence program for the copying operation is entered by the operator from an external source, for example the floppy disk shown in FIG. 4 according to the requirement, but a process control program for maintaining a determined constant temperature in an apparatus employing a heater and a security diagnosis program are constantly stored in a read-only memory of the microcontroller MC of the apparatus. Also stored in the apparatus are a floppy disk control program and a display program for displaying messages to the user, which are included in the monitor program or operating system program.

Thus the microcontroller MC maintains the heater at an appropriate temperature, by processing the data from the A/D converter by the monitor program stored in the ROM of the microcontroller MC instead of the program loaded from the floppy disk, and detects a failure in the power supply and resets the system by processing the data from the power failure detecting circuit PF by an interruption program stored in said ROM. The identification of insertion of floppy disk in the step 3 in FIG. 5 is achieved by sensing a detection signal from the floppy disk controller through the I/O port. Also the display of the file content of floppy disk in the step 4 is achieved by driving the floppy disk through an access to the floppy disk controller with the floppy disk control program, thereby reading the file labels stored in the initial addresses of the floppy disk and displaying said file labels after conversion into display image data by the display program.

After the loading of a sequence program from the floppy disk is completed by the monitor program shown in FIG. 5, said sequence program loaded in the RAM is automatically executed to determine and display the functions of the keys 51–56, and a key entry rountine is started to await the entry from the copy button or the keys 51–56. Then, in response to the actuation of the copy button, the main motor etc. are started and a copy sequence is initiated according to the mode data.

Also there can be loaded, from the floppy disk, a diagnosis program which does not perform an actual copying operation but drives particular parts such as the photosensitive drum and lamps to check the failures, thereof. In this case particular parts to be diagnosed are displayed on the display unit 50, and are operated in succession for a determined period of time in responses to the actuation of the copy key K24, and the result of diagnosis is displayed.

Figure 6:
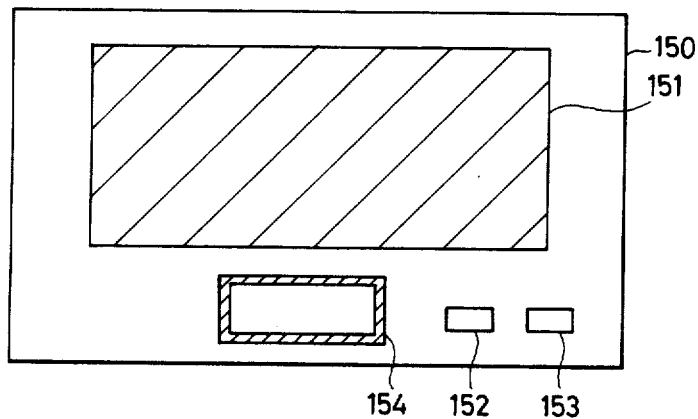
FIG. 6 is a plan view of another apparatus.

FIG. 6 is a plan view of another embodiment, wherein shown are a main body 150 of a copier; an original support table 151; a copy start key 152; a power switch 153; and a receptacle 154 in which a mode setting cassette or card can be fitted. As will be clear from the illustration, there is provided no operation/display unit.

Figure 7:
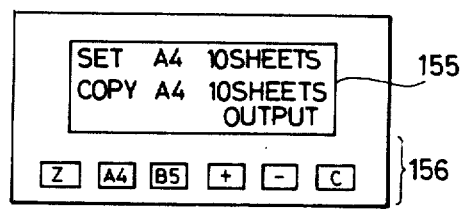
FIG. 7 is an external view of a cassette.

FIG. 7 is an external view of a cassette which can be loaded in the cassette receptacle 154, and which is provided with a display unit 155 and function keys 156. When said cassette is fitted in the main body, the information stored in said cassette is transferred, through an interface, to a memory of a controller in the apparatus. In FIG. 7, the display unit 155 indicates a state wherein a copying operation of 10 copies on A4 sheets has been instructed and completed. The function keys of the cassette are much simplified to keys indicating sheet sizes of A3, A4, A5, B4 and B5, a key indicating a special size designated by the user, and for setting the number of copies.

If the user only uses A-series sheets, there will be provided the function keys only for such A-series sizes. Also if only one size is used in an office, the function keys for sheet size selection may be dispensed with. It is also possible to prepare plural cassettes or cards for respective sizes, and to use a particular cassette or card according to a desired size. More conveniently such cassettes or cards can be appropriately color-coded. Now there will be given a brief explanation on the function keys shown in FIG. 7. Among the function keys 156, there is provided a size variation cancelling key Z. In normal state, if the size of the original is not equal to that of the copy sheet, the image is magnified or reduced according to the latter size, and, for this purpose, the unrepresented copier is capable of continuously varying the image magnification by a zoom lens. Thus, in case an A4-sized sheet is selected for an original of B4 size, the image is automatically reduced to the A4 size. On the other hand, when the key Z is actuated, the change in image magnification is cancelled regardless of the size, and the image is copied in the original size. Naturally the image is copied in the original size without the actuation of said key Z, if the sheet size is same as the original size. An increment key "+" and a decrement key "−" are used for setting the number of copies. A reset key "C" resets the previously entered copy number to "1". In the present copier, the copy density is automatically regulated to an appropriate value by detecting the density pattern of the original through an unrepresented system, but it is also possible to provide the main body of the copier with a density setting key. The copier can function only when a cassette or a card, storing the abovementioned information, is set on the copier, and the use of such cassette or card can provide advantages of:

(1) clarifying the copy charge for each office or division;

(2) functioning as a key switch, thus preventing the use by an unauthorized person;

(3) limiting sheet sizes available to each office or division; and (4) selecting different sizes or different modes through the use of plural cassettes or cards for different purposes.

Figure 8:
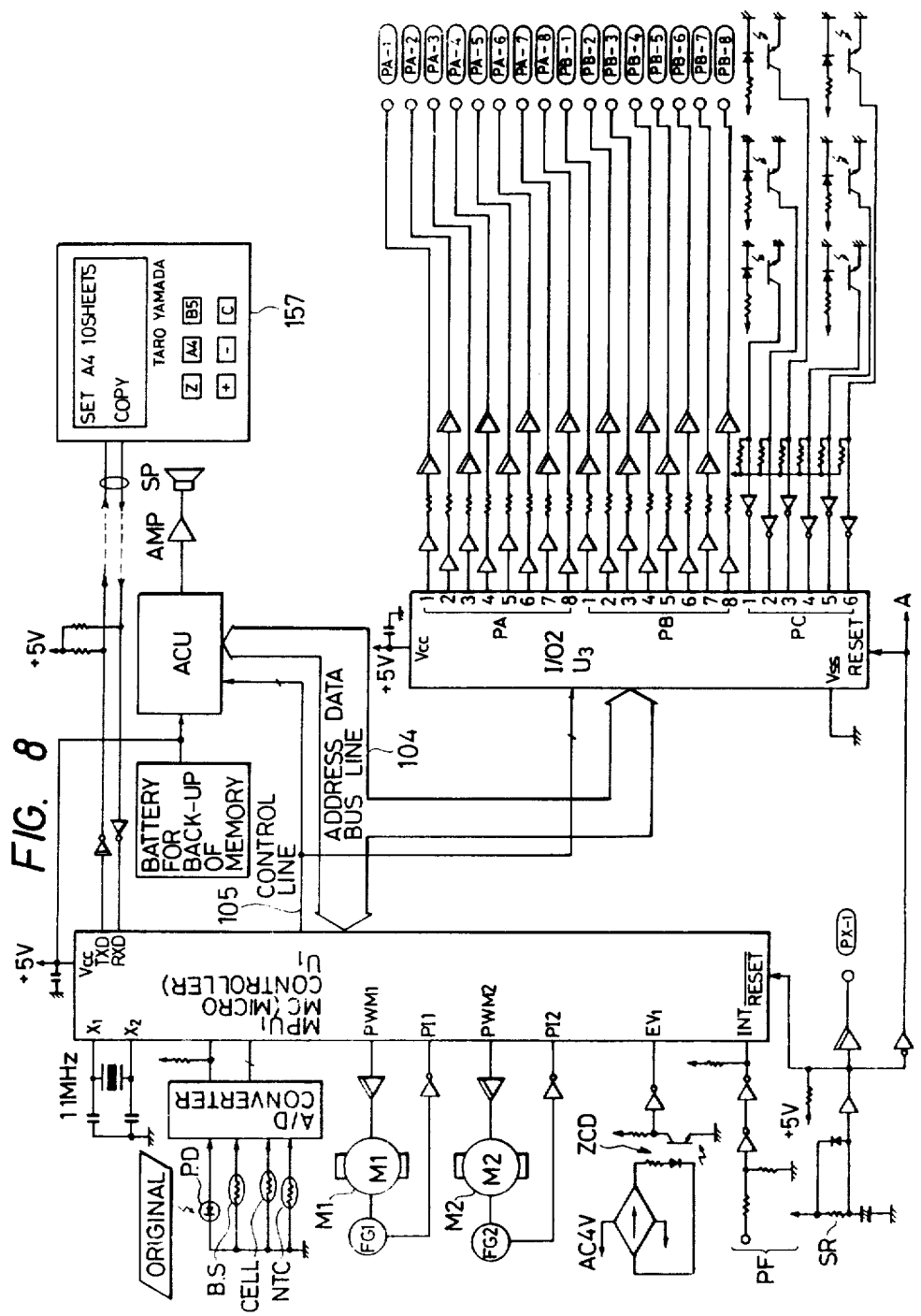
FIG. 8 is a block diagram showing an embodiment of the system.

FIG. 8 shows another embodiment of the present invention, which contains all the control functions for a medium-speed copier. The operation/display unit is not included in the circuit, since a corresponding function is incorporated in a portable card as already explained in the foregoing. The signal of a copy start key is supplied to an interruption port of the microcontroller MC. Information is transmitted to and received from a card 157 respectively through serial communication lines TXD and RXD. The present embodiment is provided with a microcontroller MC, an expansion I/O port U3, an acoustic synthesizer ACU, and a battery power source for data holding and voice message in case of a power supply failure. These chips are composed of CMOS devices in order to enable battery-powered operation. The servo functions required for driving the copier are incorporated in an intelligent microcontroller chip, so that no external components are present for this purpose. Other parts are essentially same as shown in FIG. 4.

Figure 9:
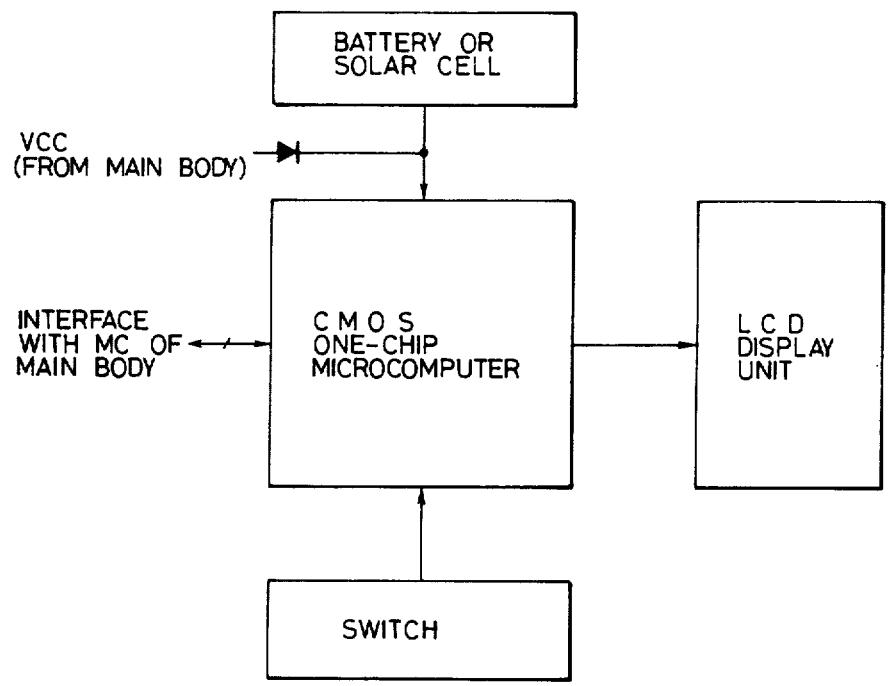
FIG. 9 is a block diagram of a mode setting card.

The internal circuit of the mode setting card or cassette 157 is composed of a C-MOS one-chip microcomputer with a structure shown in FIG. 9. When separated from the main body, power is supplied from a solar cell or a nickel-cadmium battery, but, when coupled to the main body, power is supplied therefrom. Said C-MOS one-chip microcomputer is provided therein with a CCD driver. Such microcomputer is incorporated in a card, and a memory therein stores to information on the use of copier such as number of copies for each size for enabling the calculation for each division or each individual. Such information stored on the card can be inspected even when it is detached from the main body, thus facilitating the copy charge control for each division or each individual.

Figure 10:
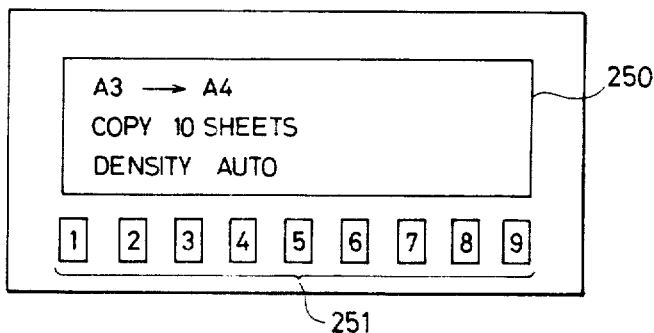
FIG. 10 is a schematic view of an operation/display unit provided with function keys.

FIG. 10 shows an embodiment having both an operation/display unit shown in FIG. 3 and an operation/display unit equipped with function keys. There are provided a multi-function display unit 250, and function keys 251. The function of each function key can be registered in advance by actuating a registration key Ⓡ shown in FIG. 3. In the illustrated example there can be made nine registrations, and a new registration can be made after erasing the registration of a corresponding key. Such erasure, for example of a function key "1", can be made by actuating a deletion in key Ⓓ shown in FIG. 3, followed by the actuation of said function key "1". In the registration, the registration key Ⓡ is actuated at first, and, if no function key is thereafter, the data are automatically registered in a data bank corresponding to an empty function key. In case a function key is actuated, the data are registered in a data bank corresponding to said function key if it is empty. If it is not empty, the display unit displays the corresponding data and a question whether or not to erase said data. Said data are deleted by actuation of the deletion key Ⓓ. If erasure is not desired, the operator may actuate the clear key Ⓒ or the registration key Ⓡ, or may proceed to another operation.

Figure 11:
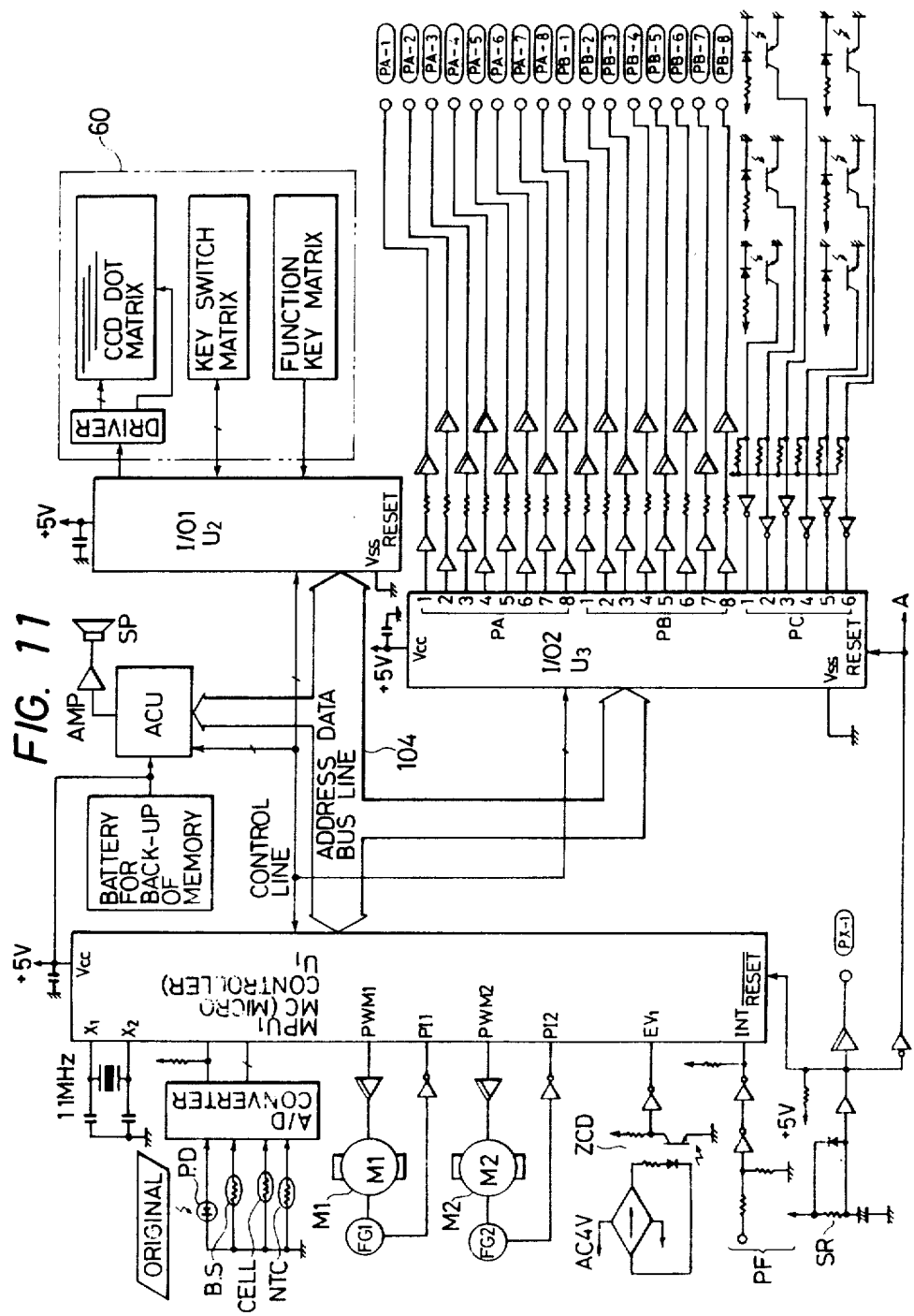
FIG. 11 is a block diagram an embodiment of the system.

FIG. 11 shows another embodiment of the present invention, comprising four chips, i.e. a microcontroller MC, expansion I/O ports U2, U3 and an acoustic synthesizer ACU, and a battery power source for enabling data memory and voice message in case of a power supply failure.

Figure 12:
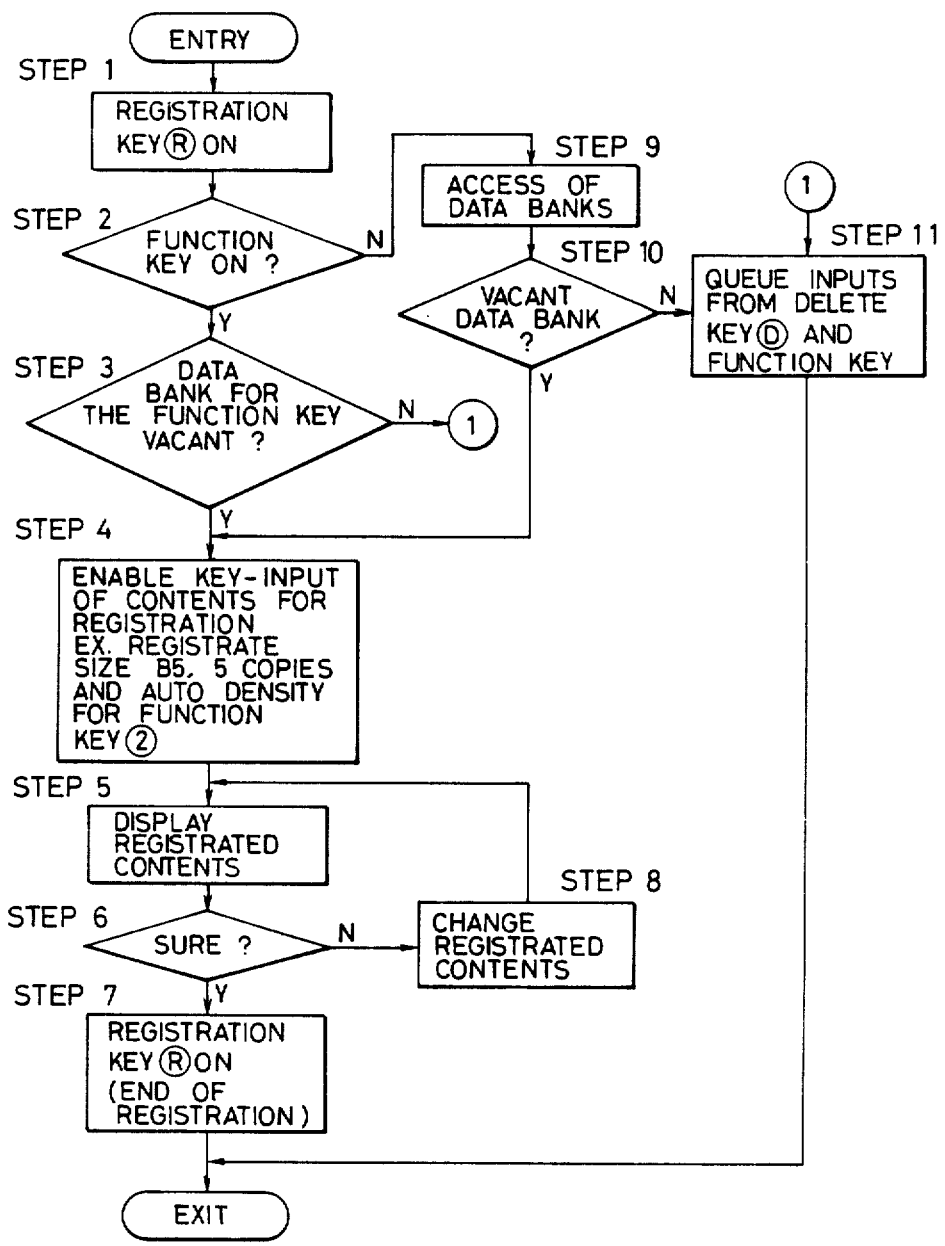
FIG. 12 is a flow chart showing a registering and erasing program.

FIG. 12 is a flow chart showing the procedure of above-mentioned registration and erasure. At first the registration key Ⓡ shown in FIG. 3 is actuated in a step 1. Then a step 2 identifies whether the function key 51 has been actuated. If not, the program proceeds to a step 9 for access to an empty data bank, and a step 10 identifies whether an empty data is available. If an empty data bank is available, the program proceeds to a step 4 to be explained later. On the other hand, if such empty data bank is not available, the program proceeds to a step 11 for awaiting the actuation of the deletion key Ⓓ and a corresponding function key, since it is necessary in this case to erase unnecessary data and make a new registration. If the actuation of function key is identified in the step 2, the program proceeds to a step 3 for identifying whether a corresponding data bank is empty. If not, the program proceeds to the step 11 explained before. On the other hand, if the corresponding data bank is empty, the program proceeds to a step 4 whereby the key entry of data to be registered is rendered possible. The illustrated example shows a case of registering "size B5, 5 copies with automatic density control" in the function key "2".

Then a step 5 displays the registered data on the display unit. A succeeding step 6 performs confirmation, and, if a correction is needed, a step 8 executes the correction of the registered data, and the program proceeds to a step 5. Said confirmation may be conducted through the acoustic synthesizer. If the registered data are correct in the step 6, the program proceeds to a step 7 in which the registration key Ⓡ is actuated again to complete the data registration. The procedure of registration and erasure is thus completed, and, if this procedure constitutes a subroutine, the program returns to a main routine in the main body.

The present embodiment is applicable also to a reader, a printer, etc. in which a document image is read and electrically processed.

We claim:

1. An image processing apparatus comprising:
   image processing means for forming an image;
   means for displaying information relating to image formations;
   a memory medium storing a program for controlling said image processing means, said memory medium being removably provided in said image processing apparatus; and
   control means for reading out the program stored in said memory medium and determining a function of said image processing apparatus in accordance with the program;
   wherein said display means displays information associated with the determined image processing function and said control means includes a memory storing a monitor program that controls the program read out from said memory medium, said memory constantly storing the monitor program.

2. An image processing apparatus according to claim 1, wherein the monitor program is adapted to control an image forming characteristic of said image processing means.

3. An image processing apparatus according to claim 1, wherein the monitor program is adapted to display information relating to the program read out from said memory medium.

4. An image processing apparatus comprising:
   image processing means for forming an image;
   a console unit having a program for controlling said image processing means and adapted to set an operation mode of said image processing means, said console unit being removably provided in said image processing apparatus; and
   control means adapted to input the program from said console unit by connecting said console unit with said image processing apparatus, thereby causing said image processing apparatus to be enabled.

5. An image processing apparatus according to claim 4, wherein said console unit includes display means for displaying image processing data by connecting said console unit with said image processing apparatus.

6. An image processing apparatus according to claim 1, wherein said memory medium is a console unit adapted to set an image processing mode, a function of said console unit being changeable in accordance with the program stored in said console unit.

7. An image processing apparatus according to claim 1, wherein said memory means incudes means for controlling an operational result by said image processing apparatus.

8. An image processing apparatus according to claim 4, wherein said console unit includes means for controlling an operational result by said image processing apparatus.

9. An image processing apparatus according to claim 1, wherein said memory medium is a floppy disk.

10. An image processing apparatus according to claim 1, wherein said memory medium is a semiconductor memory.

11. An image processing apparatus according to claim 1, wherein said control means functions to vary an operation key display in accordance with the determined image processing function.

12. An image processing apparatus according to claim 1, wherein said control means functions to display a state of read-out of a program from said memory medium.

13. An image processing apparatus comprising:
    image processing means for forming an image;
    a memory medium storing a program for controlling said image processing means, said memory medium being removably provided in said image processing apparatus; and
    control means for reading out the program stored in said memory medium and determining a specification of said image processing apparatus in accordance with the program; and
    said control means including a memory storing a monitor program that controls the program read out from said memory medium, said memory constantly storing the monitor program.

14. An image processing apparatus according to claim 13, wherein the monitor program is adapted to control an image forming characteristic of said image processing means.

15. An image processing apparatus according to claim 13, wherein the monitor program is adapted to display information relating to the program read out from said memory medium.

16. An image processing apparatus according to claim 13, wherein said memory medium is a floppy disk.

17. An image processing apparatus according to claim 13, wherein said memory medium is a semiconductor memory.

* * * * *

UNITED STATES PATENT AND TRADEMARK OFFICE
CERTIFICATE OF CORRECTION

PATENT NO. : 4,711,560
DATED : December 8, 1987
INVENTOR(S) : MASAO HOSAKA, ET AL.

It is certified that error appears in the above-identified patent and that said Letters Patent is hereby corrected as shown below:

AT [30] IN FOREIGN APPLICATION PRIORITY DATA

"Jul. 10, 1904 [JP] Japan ..... 59-143476" should read --Jul. 10, 1984 [JP] Japan ..... 59-143476--.

COLUMN 1

Line 45, "displays" should read --display--.
Line 45, "use" should read --user--.
Line 46, "operation" should read --operate the machine--.

COLUMN 2

Line 8, "case" should read --case of--.

COLUMN 3

Line 47, "diagram an" should read --diagram of an--.

COLUMN 4

Line 47, "thereby" should read --thereby preventing--.

COLUMN 7

Line 48, "rountine" should read --routine--.
Line 56, "failures," should read --failures--.
Line 59, "responses" should read --response--.

UNITED STATES PATENT AND TRADEMARK OFFICE
CERTIFICATE OF CORRECTION

PATENT NO. : 4,711,560

DATED : December 8, 1987

INVENTOR(S) : MASAO HOSAKA, ET AL.

It is certified that error appears in the above-identified patent and that said Letters Patent is hereby corrected as shown below:

COLUMN 8

Line 46, "abovementioned" should read --above-mentioned--.

COLUMN 9

Line 18, "to" should read --the--.
Line 35, "in" should be deleted.
Line 38, "key is" should read --key is actuated--.
Line 61, "data" should read --data bank--.

Signed and Sealed this

Fourteenth Day of June, 1988

Attest:

DONALD J. QUIGG

*Attesting Officer*      *Commissioner of Patents and Trademarks*